(12) United States Patent
Sarkar et al.

(10) Patent No.: US 10,633,110 B2
(45) Date of Patent: Apr. 28, 2020

(54) FUEL TANK INERTING SYSTEM

(71) Applicant: Eaton Intelligent Power Limited, Dublin (IE)

(72) Inventors: Subrata Sarkar, Burdwan (IN); Alan Massey, Southampton Hampshire (GB); Kailash Golecha, Balotra (IN); Prasant Jha, Pune (IN); Surbhi Kohli, New Delhi (IN); Amit Kalmegh, Nagpur (IN); Vismay Walle, Pune (IN); Chandrashekhar S. Nehete, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 44 days.

(21) Appl. No.: 15/953,751

(22) Filed: Apr. 16, 2018

(65) Prior Publication Data

US 2018/0229853 A1    Aug. 16, 2018

Related U.S. Application Data

(63) Continuation of application No. PCT/EP2016/074630, filed on Oct. 13, 2016.

(51) Int. Cl.
| | |
|---|---|
| B01D 53/02 | (2006.01) |
| B64D 37/32 | (2006.01) |
| A62C 3/08 | (2006.01) |
| A62C 3/06 | (2006.01) |
| B01D 53/34 | (2006.01) |
| B01D 53/46 | (2006.01) |
| B01D 53/81 | (2006.01) |

(Continued)

(52) U.S. Cl.
CPC .............. B64D 37/32 (2013.01); A62C 3/065 (2013.01); A62C 3/08 (2013.01); B01D 53/346 (2013.01);

(Continued)

(58) Field of Classification Search
CPC ... A62C 3/065; A62C 3/08; B01D 2253/1122; B01D 2257/104; B01D 53/46;

(Continued)

(56) References Cited

U.S. PATENT DOCUMENTS

| | | | |
|---|---|---|---|
| 2,952,428 | A | 9/1960 | Bridgeman |
| 3,847,298 | A | 11/1974 | Hamilton |

(Continued)

FOREIGN PATENT DOCUMENTS

| | | |
|---|---|---|
| CN | 104843189 A | 8/2015 |
| EP | 1273515 A2 | 1/2003 |

(Continued)

OTHER PUBLICATIONS

International Search Report PCT/EP2016/074630, dated Mar. 21, 2017.

(Continued)

*Primary Examiner* — Christopher P Jones
(74) *Attorney, Agent, or Firm* — Fishman Stewart PLLC

(57) ABSTRACT

An aircraft fuel tank inerting system includes an inlet, an oxygen absorption unit, and a vent to discharge oxygen from the system. The inlet may be configured to be in fluid communication with a ullage of a fuel tank. In embodiments, the oxygen absorption unit is in communication with the inlet and includes a chamber, a temperature reversible oxygen absorption medium within said chamber, and a temperature controller for selectively heating or cooling the medium. The reversible oxygen absorption medium may be a medium which absorbs oxygen by chemisorption.

17 Claims, 5 Drawing Sheets

(51) Int. Cl.
   *B65D 90/44* (2006.01)
   *B64D 13/08* (2006.01)
   *B64D 13/06* (2006.01)

(52) U.S. Cl.
   CPC ............. B01D 53/46 (2013.01); B01D 53/81 (2013.01); *B01D 2253/1122* (2013.01); *B01D 2257/104* (2013.01); *B64D 13/08* (2013.01); *B64D 2013/0659* (2013.01); *B65D 90/44* (2013.01)

(58) Field of Classification Search
   CPC ................... B01D 53/81; B64D 13/08; B64D 2013/0659; B64D 37/32; B65D 90/44
   See application file for complete search history.

(56) References Cited

U.S. PATENT DOCUMENTS

| | | | |
|---|---|---|---|
| 4,786,294 | A | 11/1988 | Jonqueres et al. |
| 6,585,192 | B2 | 7/2003 | Beers |
| 2001/0003950 | A1* | 6/2001 | Zhang .................... B01D 53/02 95/102 |
| 2004/0094201 | A1 | 5/2004 | Verma et al. |
| 2004/0226438 | A1 | 11/2004 | Jones |
| 2009/0230248 | A1 | 9/2009 | Byrd et al. |

FOREIGN PATENT DOCUMENTS

| | | |
|---|---|---|
| EP | 2548630 A1 | 1/2013 |
| JP | S63315144 A | 12/1988 |
| JP | 2013198878 A | 10/2013 |
| JP | 2014012619 A | 1/2014 |

OTHER PUBLICATIONS

UK Intellectual Property Office: Search Report under Section 17(5), dated Jun. 23, 2016.

* cited by examiner

FUEL TANK INERTING SYSTEM

CROSS-REFERENCE TO RELATED APPLICATION

This application is a continuation of International Application No. PCT/EP2016/074630, filed Oct. 13, 2016, which claims the benefit of Indian application 3300/DEL/2015, filed Oct. 14, 2015, Indian application 3966/DEL/2015, filed Dec. 5, 2015, and Great Britain application 1601019.1, filed Jan. 20, 2016, the disclosures of all of the foregoing are incorporated herein by reference.

TECHNICAL FIELD

This invention relates to aircraft fuel tank inerting systems, particularly but not exclusively to an inerting system for fixed wing aircraft.

BACKGROUND

In fixed wing aircraft, the fuel is usually stored in tanks in the main wing. A typical configuration includes a centre tank and a one or multi-compartmented main tank in each wing. The tanks are generally vented, to avoid unwanted pressurisation, and, in many configurations, it is common to have a surge tank located outboard of each main wing tank. The venting of the tanks may be through the surge tank which typically includes a NACA intake designed to maintain a modest pressurisation of the tanks when the aircraft is in flight, but to allow venting when required.

Aircraft fuel tanks are now subject to fuel tank flammability requirements (FAR25.981b). One conventional approach to meeting this requirement is to provide an "inerting system" which is effective in reducing the flammable gas within the ullage space which exists above the fuel within each fuel tank. For example, inerting systems may comprise a system in which Nitrogen Enriched Air (NEA) is generated by an On Board Inert Gas Generating System (OBIGGS) which is then pumped into the fuel tanks. This reduces the flammable oxygen content of the fuel tank. A prior art inerting system is, for example, disclosed in U.S. Pat. No. 6,585,192.

It will be appreciated that the provision of any inerting system carries a direct weight and/or space penalty for the aircraft (which may result in decreased range and/or fuel efficiency). Accordingly, there is an ongoing desire to provide alternate inerting systems.

SUMMARY

The terms "absorption" or "absorb" (and likewise the opposite terms "desorption" or "desorb") as used herein is intended to be broadly interpreted. The absorption of oxygen could, for example, be by adsorption or chemisorption. Cobalt or cobalt derived materials may, for example, be used in two different absorption mechanisms depending upon the configuration of the inerting system. In embodiments of the disclosure, cobalt may absorb oxygen through chemisorption which results in a change in the internal molecular architecture of the cobalt or cobalt material. In other embodiments, such as U.S. Patent Application Publication 2009/0230248 (Byrd et al.), the cobalt may act as an adsorption agent. The mechanism will, for example, depend upon the pressure used in the system.

A plurality of oxygen absorption units may be provided in parallel.

The inerting system may further comprise a control, arranged to cycle the plurality of oxygen absorption units. The units may be cycled between: a first, oxygen absorption configuration; and a second, oxygen desorption, configuration.

The system may comprise at least two parallel oxygen absorption units and the controller is configured such that at least one unit is in the first oxygen absorption configuration when another unit is in the second, oxygen desorption configuration, so as to ensure that continuous oxygen absorption is available.

In another aspect, this invention provides an aircraft fuel tank inerting system, comprising:
  an inlet, in fluid communication with the ullage of a fuel tank;
  an oxygen absorption unit, in communication with said inlet, and comprising:
    a chamber,
    a temperature reversible oxygen absorption medium within said chamber, and
    a temperature controller for selectively heating or cooling the medium;
  a vent for discharging oxygen from the inerting system, wherein the reversible oxygen absorption medium may, for example, be a medium which absorbs oxygen by chemisorption.

The oxygen absorption medium may, for example, comprise cobalt or a cobalt-derived material. Such materials have been found to have particularly advantageous absorption capacities and absorption rates. In particular, the applicants have recognised that the rate of absorption and desorption of oxygen by cobalt and cobalt-derived materials may be sufficient to provide a system which can be conveniently used in a cyclic process for the removal of oxygen from a fuel tank during operation. The particular absorption capacity and rate of the selected medium will directly impact the potential sizing and weight of the inerting system.

The oxygen absorption medium may be provided in the form of a crystalline or solid bed.

Examples of suitable cobalt based materials (which may for example be in solid/crystalline form) are: N,N'-bis(salicylidene)ethylenediamine]cobalt [Co(salen)], CoSalophen, DiCobalt-o-Bistern, Co(S-Me2en)(NO3)2, 2,4,6-Tri (mesityl)-phenol, 2-aminoterephthalato-linked deoxy system, $C_{80}H_{97}Co_4N_{17}O_{29}$.

The applicants have also recognized that commercially available absorption mediums from other technological fields may be suitable for use in implementing embodiments of the invention. For example, oxygen absorption medium are known to be used in food preservation. Such commercially available mediums may for example include: (1) iron powder oxidation, (2) Ascorbic acid oxidation, (3) Enzymatic oxidation, (4) Unsaturated hydrocarbon oxidation, (5) Photosensitive dye oxidation, (6) Nylon polymer Further details on such methods may for example be found at: http://www.intechopen.com/books/structure-and-function-of-food-engineering/oxygen-scavengers-an-approach-on-food-preservation The inerting system may further comprise a control system. The control system may include control valves. Control valves may, for example, be provided on the inlet and/or the vent. The control system may further control the temperature controller. For example, the control system may be arranged to cycle the temperature controller between a heating mode and a cooling mode. Such alternate heating and/or cooling may enable or assist the absorption medium in absorbing oxygen so as to reduce the flammability of the ullage (generally when the medium is cooled). Additionally, the temperature control may assist or enable the desorbing of the absorption medium in order to recharge the oxygen absorption unit.

The temperature controller may be a heater. For example, an electrical heating element. Additionally, or alternatively, the temperature controller may comprise a heat exchanger associated with the chamber of the oxygen absorption unit. For example the heat exchanger may be provided on an external surface of the chamber (with the absorption medium for example being on the opposing internal surface of the chamber).

The heat exchanger may be a jacket which partially surrounds a portion of the chamber. The jacket may, for example, be arranged to circulate hot and/or cold air for either heating or cooling the chamber, and absorption medium therein. The temperature controller may be arranged to selectively supply the heat exchanger with hot or cold air. The hot air may for example be provided from bleed air. Other convenient sources of hot air may be available within the aircraft systems (for example using a compressor in a bleedless aircraft architecture). The cold air may, for example, be provided from cabin waste air. The cold air may alternatively be from a Ram air source. The skilled person will appreciate that other sources of cold air may be available depending upon the particular aircraft configuration.

In order to reduce the size and/or weight of the inerting system, the oxygen absorption units may be cycled between an absorption and the de-absorption mode of operation. The cycle time may be relatively short. For example, several cycles per hour and, for example, a total cycle time of approximately 5 minutes.

The system may comprise a plurality of oxygen absorption units. The absorption units may be arranged in parallel.

The system may further comprise an arrangement, for example, a valve arrangement, configured to enable switching of the oxygen absorption unit that is in communication with the ullage. For example, the system may include multiple inlets each associated with an oxygen absorption unit and provided with a control valve. Alternatively a single inlet, in further communication with the ullage of a fuel tank, may be provided and a downstream valve arrangement may be provided to control the communication between said inlet and each oxygen absorption unit.

The inerting system may be arranged to cycle the, or each, oxygen absorption unit between; a first oxygen absorbing configuration in which the oxygen absorption unit is in fluid communication with the fuel tank ullage, and the temperature control is cooling the medium; and a second oxygen desorbing configuration in which the oxygen absorption unit is isolated from the fuel tank ullage, and the temperature controller is heating the medium. By ensuring that that oxygen absorption unit is isolated from the fuel tank ullage during desorption the system prevents low pressure generation in the fuel tank and any resulting artificial vapour generation.

In configurations in which the inerting system comprises a plurality of oxygen absorption units, the oxygen absorption units are configured or controlled such that at least one unit is in the first, oxygen absorption configuration when another unit is in the second, oxygen desorption, configuration. This ensures that continuous oxygen absorption to the fuel tank ullage is available. In some embodiments an inerting system controller may electronically ensure that one unit is always available in an oxygen absorbing configuration. Alternatively, the system may be configured such that two-way valve arrangements or the like provide a direct interdependency between the configuration of a first and second absorption unit.

The vent for discharging oxygen from the inerting system may comprise an ejector. The ejector may be provided with motive flow from a source of pressurised air. For example, the pressurised air source may be bleed air or from a source of compressed air depending upon the aircraft configuration. The use of an ejector in the vent provides a depressurisation effect on the chamber (with which the inlet is in fluid communication). This assists in desorption of oxygen from the medium and may also provide a preferential pressure gradient to encourage desorbed oxygen out of the oxygen absorption unit.

The oxygen absorption medium may be cobalt or cobalt derived material.

A flow control valves may be provided on or associated with the inlet. Flow control valves may be provided on or associated with the outlets. For example, the inlet flow control valve and the flow control valve for the first outlet may be open and the flow control valve for the second outlet may be closed when the air separation module is in the oxygen absorption mode. Likewise, for example, the inlet flow control valve and the flow control valve for the first outlet may be closed and the flow control valve for the second outlet may be open when the air separation module is in the oxygen desorption mode.

The second outlet may be a low pressure outlet. The outlet may be provided with a pump. For example, the second outlet may comprise an ejector. The pump (or ejector) may provide a reduced pressure at the second outlet to draw oxygen from the chamber when the air separation module is in an oxygen desorption mode. When the pump is an ejector, the ejector may receive a motive flow from a source of bleed air. The second outlet flow control valve may control the flow of bleed air to the ejector.

The inlet may receive air from a high pressure source. Accordingly, the air separation unit may be arranged such that it is subject to a relatively high pressure (and for example relatively low temperature) flow when in the absorption mode and may be subject to a relatively low pressure (and for example relatively high temperature) flow when in the desorption mode. In the desorption mode the relatively low pressure flow may be subjected to the air separation unit as the motive flow to an ejector on the second outlet.

By providing a relatively high pressure inlet flow to the air separation module it may be noted that the absorption may be via adsorption (and the desorption will be de-adsorption).

According to another aspect of the invention there is provided an inerting system comprising an air separation module in accordance with an embodiment, a source of air in communication with the inlet, a conduit for providing nitrogen enriched air from the first outlet to at least one aircraft fuel tank and an outlet conduit for discharging oxygen or oxygen enriched air from the second outlet.

The system may comprise at least two air separation modules. The inerting system may be configured or controlled such that at least one air separation module is in the oxygen absorption mode when another of the at least two air separation modules is in the second, oxygen desorption configuration. This may allow a system to be configured such that it is able to provide a substantially continuous supply of nitrogen enriched air during operation.

The at least two air separation modules may be arranged in parallel. For example a single source of air may be connected to multiple air separation modules. The source may be connected to the air separation modules via a branched inlet line. A flow control valve may be provided for the inlet of each air separation module. The first outlets of each air separation modules may be in communication with a common conduit for providing receiving nitrogen enriched air to the fuel tank. A flow control valve may be provided for the first outlet of each air separation module.

The inerting system may further comprise a source of bleed air. The inerting system may further comprise a source of aircraft cabin air.

The inerting system may further comprises a pump arranged to receive a source of air and provide high pressure flow of air to the inlet(s) of the air separation module(s). The pump may be arranged to provide a high pressure and low temperature flow of air. The pump may be an ejector. Bleed air may be provided as motive flow to the ejector and cabin air may be provided to the ejector inlet.

The inerting system may comprises at least one oxygen sensor located between the first outlet of the air separation module, or air separation modules, and the fuel tank. An oxygen sensor may be associated with each air separation module. The inerting system further comprise a controller. The controller may receives signals from the at least one oxygen sensor and switch the at least one air separation module from its oxygen absorption mode to its oxygen desorption mode when the oxygen decreases below a threshold value. The controller may control the flow control valves of the at least one air separation module.

According to a further aspect of the invention, there is provided an aircraft comprising at least one fuel tank and an inerting system in accordance with an embodiment of the invention.

Whilst this invention has been described above, it extends to any inventive combination or sub-combination of the features set out above, in the formal description or the claims or the drawings.

BRIEF DESCRIPTION OF THE DRAWINGS

By way of example only, embodiments of the invention will now be described in detail with reference to the accompanying drawings in which.

DETAILED DESCRIPTION

Figure 1:
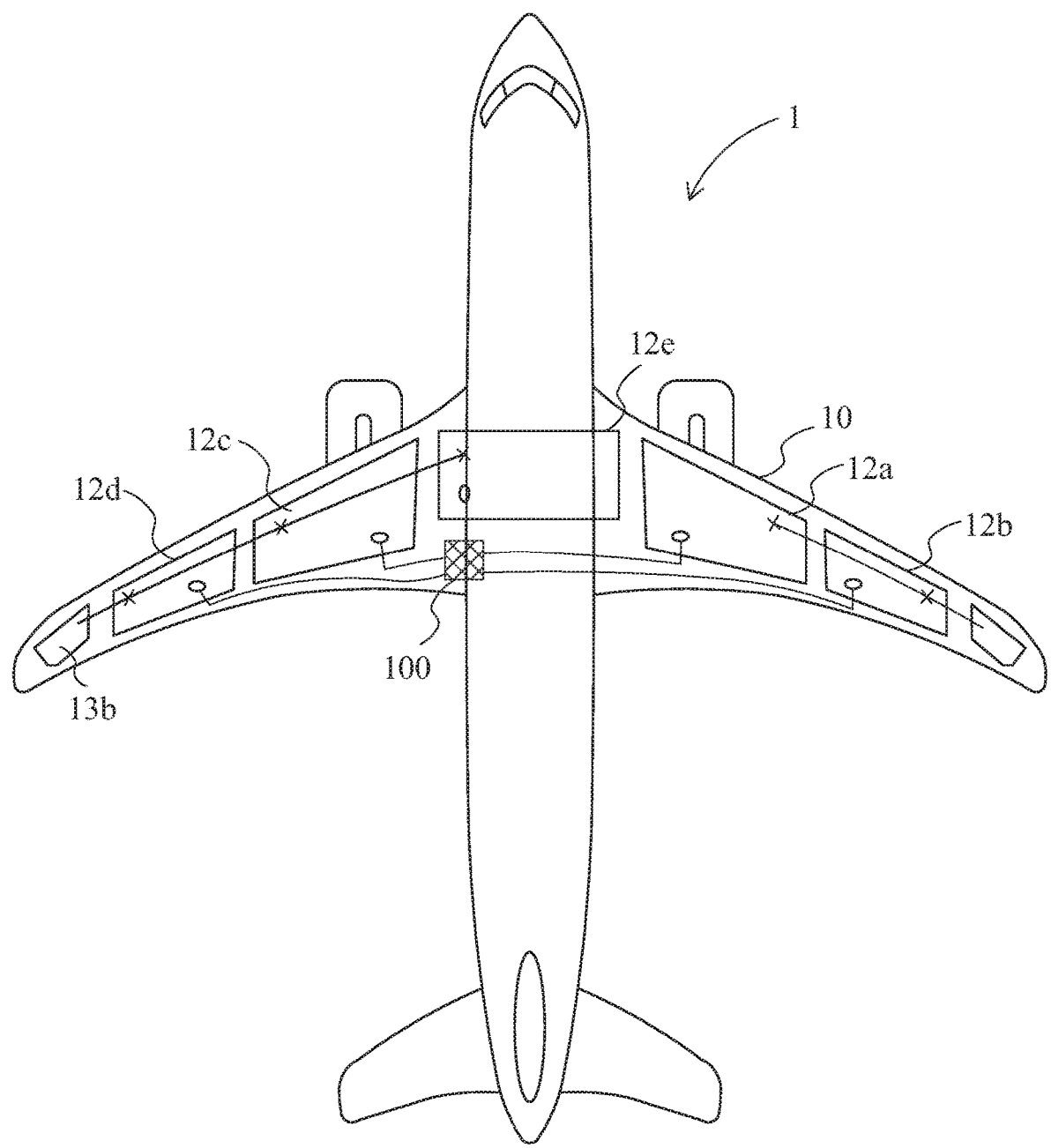
FIG. 1 is a schematic representation of an aircraft including a fuel system having a fuel inerting system.

FIG. 1 shows a typical fixed wing aircraft, which may for example be a civil airliner. The aircraft includes a multi-tank fuel system 10. As is typical of such aircraft, the fuel system 10 includes a plurality of fuel tanks 12a to 12e, including for example a centre fuel tank 12e and a plurality of fuel tanks in each wing. The wings are further provided with a surge tank 13 which is associated with a vent arrangement to enable venting of the fuel tanks 12 during operation. An inerting system 100 is provided for ensuring a reduced flammability environment and is in communication with each fuel tank 12 via appropriate conduits.

Figure 2:
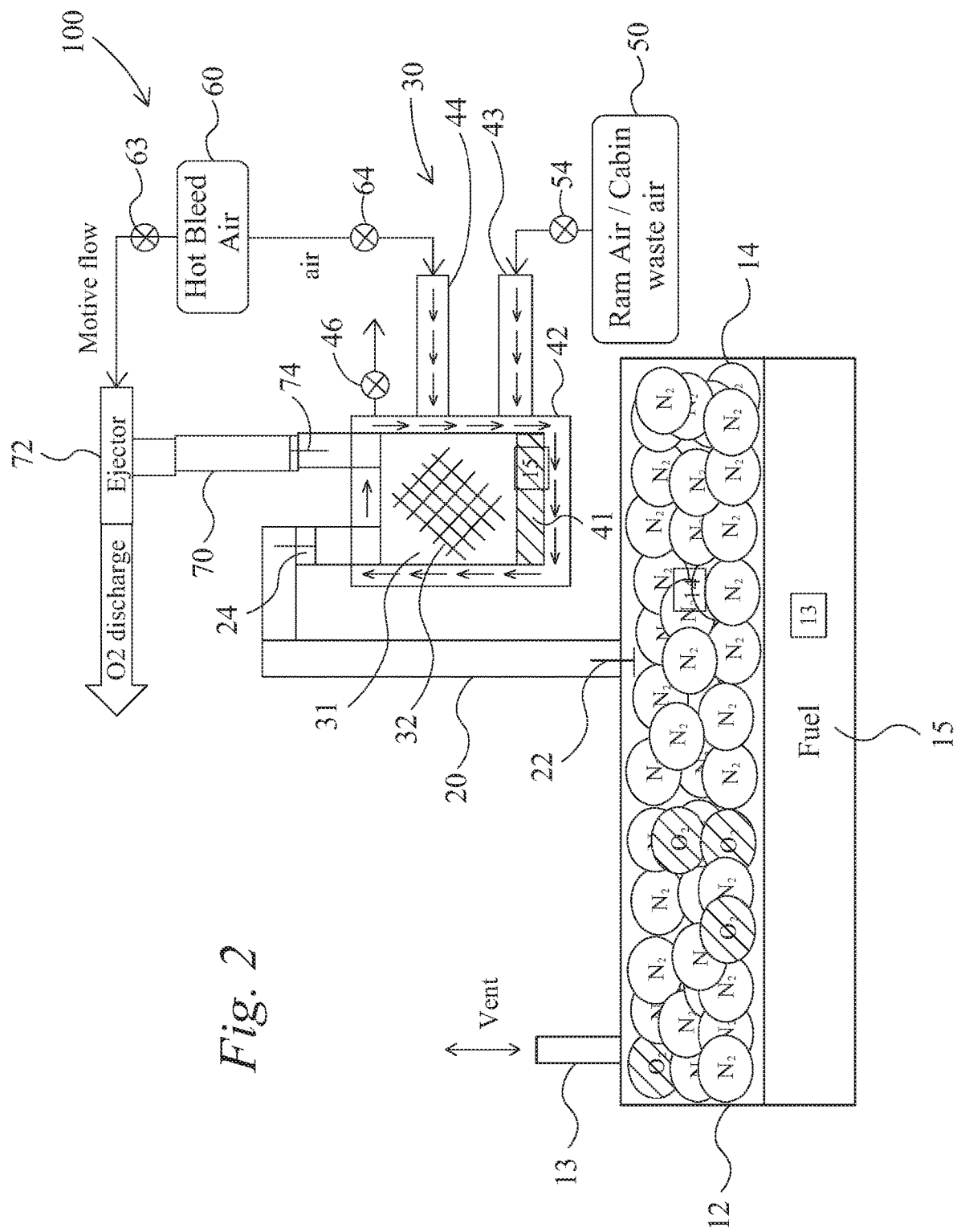
FIG. 2 is a schematic representation of a fuel inerting system in accordance with an embodiment of the invention.

The inerting system in accordance with an embodiment of the invention is shown schematically in FIG. 2. The inerting system 100 is in fluid communication with the ullage 14 of at least one fuel tank 12 via an inerting system inlet 20 (the skilled person will appreciate that the inerting system may be in fluid communication with a plurality of separate fuel tanks depending upon the overall configuration of the aircraft but only one tank is shown for clarity). As shown schematically in the figure, the fuel tank 12 includes an atmospheric vent 13 (which may be connected via a venting system (via a surge tank). The fuel tank contains a quantity of fuel 15 above which exists an air space known as an "ullage" 14. The skilled person will appreciate that the purpose of any inerting system is to ensure that the atmosphere within the ullage 14 has a limited oxygen content in order to reduce flammability. Most current conventional inerting systems generally operate by providing a source of nitrogen-enriched air to the ullage 14.

In embodiments of the invention the inerting system 100 is arranged to extract oxygen content from the ullage 14 by means of absorption by a medium such as a cobalt derivative. Cobalt derivatives have a high affinity towards oxygen and may releasably absorb oxygen through a chemisorption process which is releasable by heating the cobalt derivative.

The inerting system 100 in accordance with an embodiment comprises an oxygen absorption unit 30 which has a chamber 31 within which is provided the absorption medium 32 in any convenient form. An inlet 20 extends between the ullage 14 of fuel tank 12 and the oxygen absorption unit 30. A valve 22 may be provided at the interface between the fuel tank 12 and inlet 20. The valve 22 may be normally open but it is provided to prevent fuel from entering the inlet 20 (for example during manoeuvres or when the fuel tank 12 is relatively full). The inlet valve 22 could for example be a float valve. Downstream of the inlet valve 22, a separate control valve 24 may be provided in order to allow isolation of the chamber 31 of the oxygen absorption unit 30 from the inlet 20. It will be appreciated that the valves 22, 24 could be combined in a single component.

An outlet 70 is also provided to allow venting of the chamber 31 and is provided with a further control valve 74. As will be explained further below, an ejector 72 may be provided in the outlet 70 to assist in discharging of oxygen from the inerting system 100.

The oxygen absorption unit 30 is also provided with a temperature control arrangement. The temperature control arrangement may include a heater 41. The heater may for example be an electrical heater. Additionally or alternatively, the temperature control may include a heat exchange arrangement which may be associated with an outer surface of the chamber 31. In the illustrated example, the heat exchanger comprises a jacket 42 which at least partially surrounds the chamber 31. The jacket 42 defines a space through which heating and/or cooling air may be circulated around the chamber 31 so as to selectively provide either a heating or cooling effect upon the absorption medium 32 contained within the chamber 31. The jacket 42 is provided with an inlet 43 for cold air. The cold air may be provided from a source 50 which may for example be from Ram air, cabin waste air or any other suitable cold air source, and the supply may be controllable by a control valve 54. A separate inlet 44 is provided for hot air from a source 60. The hot air may be from bleed air or (in aircraft without or with reduced bleed air availability) from a secondary source of high pressure air or a compressor. The hot air supply may be controlled via a control valve 64. An outlet 46 with a further control valve is provided for discharging the hot or cold air from the jacket 42.

Operation of the inerting system of FIG. 2 will now be described. The inerting system is intended to operate in a cyclic manner with the system size dependent upon the absorption and desorption rate of the absorbent medium. For example, a typical absorption cycle may take around 3 minutes and a desorption cycle may take around 2 minutes. It may be appreciated that in order to obtain a desired, substantive constant, rate of absorption with respect to time the cycling of the system may be selected so that a medium does not fully saturate with oxygen prior to the commencement of desorption. The skilled person will appreciate that the highest requirements on the inerting system typically take place during descent of the aircraft due to the inward venting of the fuel tank. For example, at a typical descent rate of 2,500 feet per minute, it may be necessary to absorb a peak of 0.35 kg of oxygen during descent between 5000 and 4000 feet which may typically take a time period 24 seconds. Depending upon the selected system size, a total absorption/desorption cycle may be around 5 minutes, such that the system may cycle approximately 12 times per hour.

In the oxygen absorption configuration the chamber 31 is in fluid communication with the ullage 14 of the fuel tank 12 via the inlet 20 with normally open valve 22 and control valve 24 both being open. The control valve 74 on the outlet of the chamber 31 is closed in this configuration (so as to maintain pressure in the chamber which may aid absorption). The absorbent medium 32 is being cooled via the cool air source 50. The inlet 43 is receiving cool air which is circulating around the jacket 42 (and the control valve 64 has shut off the hot air supply to the inlet 44). The cooling of the absorbent medium encourages/assists the absorption of oxygen by the medium.

After a predetermined time period (based upon the calculated absorption of the medium 32) the oxygen absorption unit 30 is switched to a desorption configuration so as to purge the absorbed oxygen from the absorption medium 32 within the absorption unit 30. In order to encourage the desorption of the oxygen the absorption medium 32 is heated and this may be achieved by a combination of the use of a heater 15 (for example electrically powered) and by switching the feed to the jacket 42 from the cold air supply 50 to the hot air supply 60 using the control of valves 54 and 64. Prior to the commencement of the desorption the control valve 24 on inlet 20 is closed to ensure that oxygen cannot return to the ullage 14 of fuel tank 12. As oxygen gets released it may be vented via the outlet 70 through open control valve 74. A motive flow of hot bleed air 60 may be provided by control valve 63 to an ejector 72 so as to encourage flow of oxygen from the outlet 70. Advantageously, the ejector creates a reduced pressure in the chamber 31 of the oxygen absorption unit 30 which further encourages desorption of the oxygen from the medium 32. A skilled person will appreciate that in some aircraft the availability of hot bleed air may be limited, in which case the motive flow may be readily substituted with, for example, high pressure air from a compressor or other secondary source of high pressure air.

Figure 3:
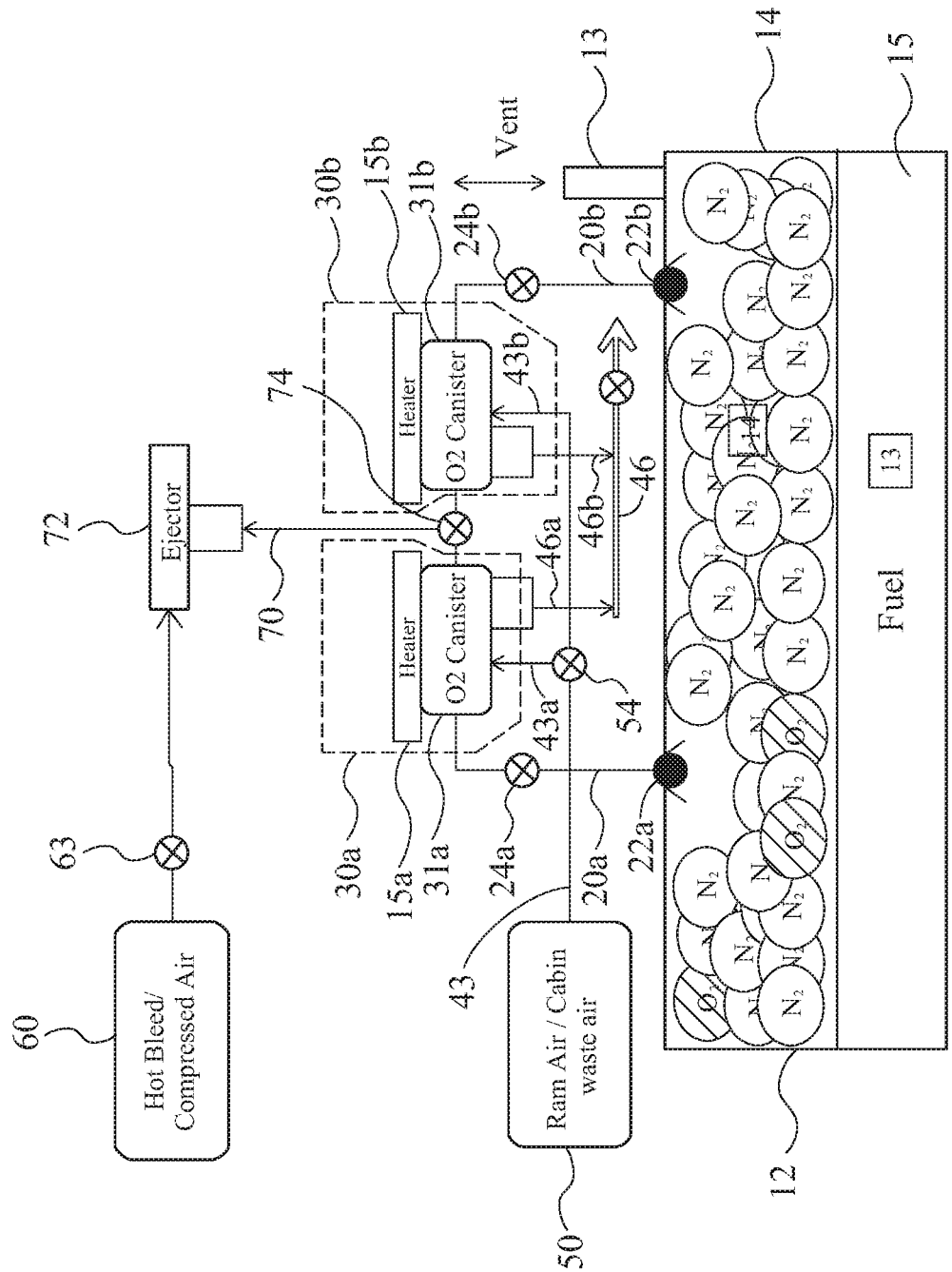
FIG. 3 is a schematic representation of a fuel inerting system in accordance with an alternative embodiment of the invention.

A further embodiment of the invention is illustrated in FIG. 3. In this embodiment a plurality of oxygen absorption units 30a, 30b are provided and arranged in parallel. As such, one of the oxygen absorption units may always be available for absorbing oxygen from the ullage 14 of the fuel tank 12. In the illustrated embodiment, two absorption units 30a, 30b are used. The two absorption unit 30a and 30b are substantially identical (and could be interchangeable line replacement units) and are also substantially identical in operation to the oxygen absorption unit of the first embodiment.

Each oxygen absorbing unit 30a, 30b is fed via a separate inlet 20a, 20b, with independent control valves 24a and 24b (which will be controlled independently by a single inerting system controller). A skilled person will of course appreciate that alternatively a shared inlet arrangement may be provided with directional valve arrangements to selectively place one of the oxygen absorption units 30a, 30b in communication with the fuel tank ullage 14 depending upon the phase of operation.

As in the previous embodiment, ram air or cabin waste air is provided as a cooling medium to the canister 31 of the oxygen absorbing unit. It may be noted that the cooling air may be provided via a single inlet valve 43 controlled by a two way valve 54, arranged such that the supply of cooling air is only provided to one of the oxygen absorption units at any one time. A similar arrangement may be provided for hot bleed air for heating of the oxygen absorption units 30a, 30b; however, in the illustrated embodiment only a heater 15a and 15b is provided in each absorption unit 30a, 30b.

A single outlet 70 is provided and connected to both the first and second oxygen absorption units 30a and 30b via a two-way control valve 74. Upstream of the control valve 74 is provided an ejector 72 provided with motive flow from a source 60 of hot bleed or compressor air via a control valve 63. The control valve 74 on the outlet is a two-way valve arranged such that only a single container 31a, 31b of the first and second absorption units 30a and 30b can be in communication with the outlet at any one time. Thus, the outlet will be available to extract oxygen and to provide a decreased pressure to one of the oxygen absorption units 30a, 30b and will automatically be closed off from the other. It will be appreciated that the outlet valve 74 and the cooling valve 54 are always in connection with different containers 31a and 31b of the first and second absorption units 30a and 30b during operation (and could even therefore be directly linked).

In operation, initially the first oxygen absorption unit 30a is in an absorption configuration: the valve 24a is open to allow fluid communication with the ullage 14 and valve 54 is providing cooling air to the jacket (not shown) surrounding the container 31a. Thus the absorption medium within the first oxygen absorption until 30a is absorbing oxygen from the ullage 14. In parallel the second oxygen absorption unit 30b is in a desorption configuration: it is not receiving cooling air from the source 50 and heater 15b is switched on to heat the absorption medium within the container 31b. The container 31b is in communication with the outlet 70 such that the ejector 72 is providing a motive force to expel oxygen and is reducing the pressure within the container 31b. The inlet line 20b is closed via the control valve 24b.

After a predetermined cycle time (based upon the absorption cycle time for the absorption unit 30) the configurations of oxygen absorbing units 30a and 30b are simultaneously reversed, such that the second absorption unit 30b is in the oxygen absorbing configuration and the first oxygen absorbing unit 30a is in an oxygen de-absorption configuration. Thus, the arrangement of FIG. 3 enables a continuous system operation in which at least one of the oxygen absorption units is always available for absorption whilst the other is in parallel being purged of oxygen ready for the subsequent cycle.

In order to assess the potential performance of an embodiment of the invention, a computational model of an inerting system based upon an embodiment of the invention and a current single aisle short range commercial aircraft was carried out. The model was based upon a typical flight profile for such an aircraft taking into account the various stages of operation from initial taxi through take off, climb and cruise to descent, landing and final taxi. In order to account for the most strenuous flight profile, an initial oxygen tank content of 21% was assumed for a first flight.

Figure 4:
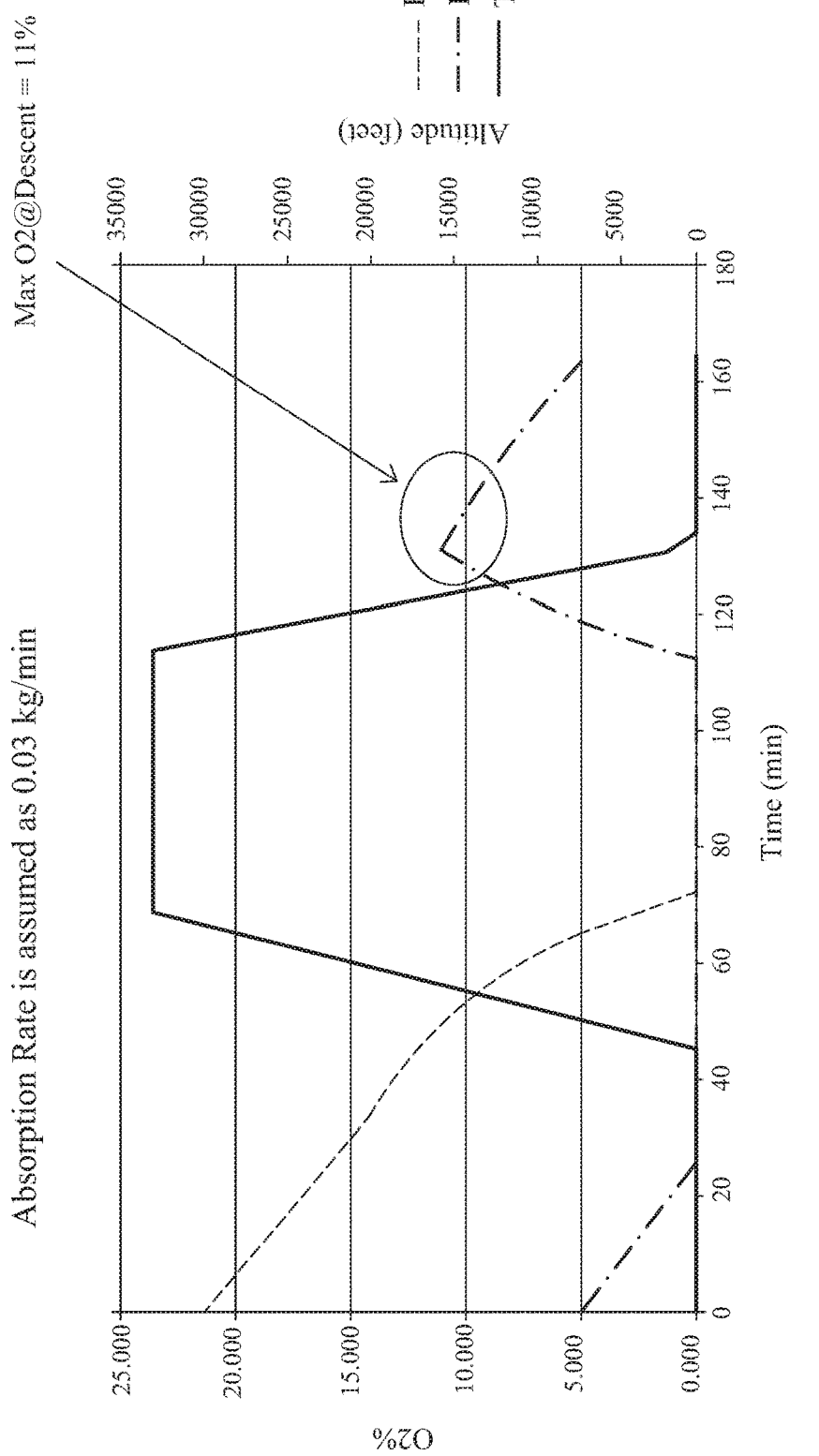
FIG. 4 is a graphical representation of the oxygen content in a fuel tank during a typical flight profile based upon a computational model.

Based upon an assumed absorption rate of 0.03 kilograms per minute, a system in accordance with the embodiment of the invention was considered to have an absorption rate of 6 minutes and de-absorption rate of 4 minutes. On this basis a single cycle was able to absorb 0.18 kilograms of oxygen. The oxygen absorption capacity of a typical cobalt derivative is approximately 5% by weight resulting in a required weight of approximately 3.6 kilograms of cobalt derived material. This would provide a system with the capacity to absorb 01.08 kilograms of oxygen in a single hour. The total oxygen absorption required for a first flight (based upon a worst case scenario making no allowance for the decrease in density of the oxygen with altitude) was calculated to be 2.465 kilograms. By providing two parallel beds (in accordance with the embodiment of FIG. 3) with each bed having 3.6 kilograms of absorbent material, the total oxygen absorption capacity in an hour is 2.16 kilograms. This was considered to show good potential for provision of an acceptable performance of an inerting system verses total system weight. The time profile and oxygen content of the fuel tank and flight profile are shown in FIG. 4.

Figure 5:
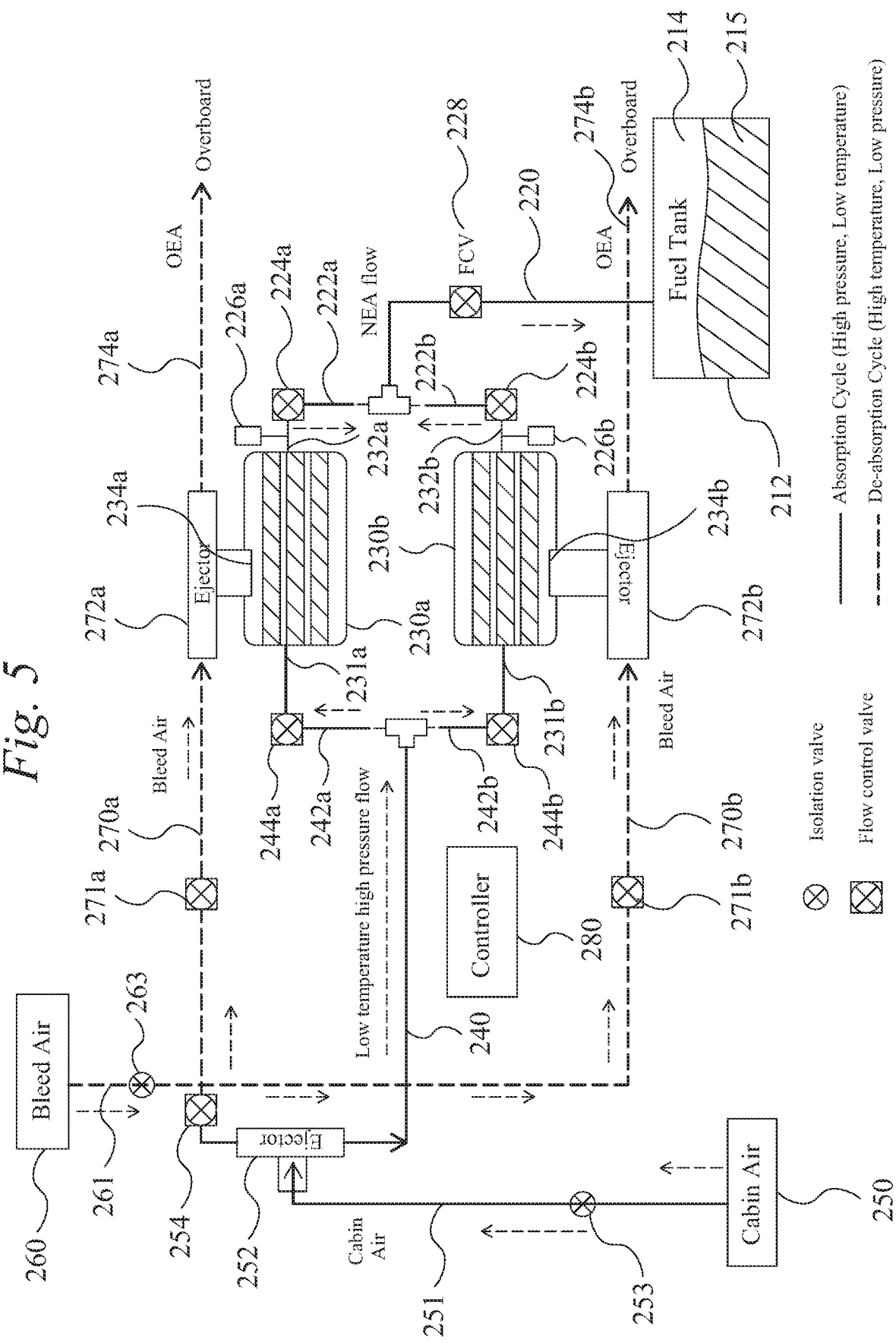
FIG. 5 is a schematic representation of a fuel inerting system in accordance with an alternative embodiment of the invention.

A further embodiment of the invention is shown in FIG. 5. This embodiment differs from those of FIGS. 2 and 3 in that it utilizes an oxygen absorption unit to extract oxygen from air which is then provided to the fuel tank as Nitrogen Enriched Air (NEA) to reduce the flammability of the environment of the fuel tank. In other words, in this embodiment the invention is used to provide an alternative air separation module for use in an inerting system. Further, as explained in further detail below, as this embodiment utilizes a high inlet pressure, the cobalt or cobalt derived absorption medium will act as an adsorption medium (whereas in the above embodiments the absorption is via chemisorption as the feed pressure is relatively low).

The inerting system of FIG. 5 comprises a pair of parallel air separation units each having an oxygen absorption units 230a and 230b which may be of similar construction to those of previous embodiment and contain a bed (or a plurality of beds) of cobalt derived material.

Each oxygen absorption unit 230a, 230b forms an air separation module having a single inlet 231a, 231b. The air separation modules 230a, 230b also each include a first outlet 232a, 232b (which as explained below is used in the absorption mode) and a second outlet 234a, 234b (which is used in the desorption mode).

Cabin air (or an alternate air source such as RAM air) is provided via a supply line 251 to an ejector 252. An isolation valve 253 is generally provided to allow the supply to be isolated from the inerting system. The ejector 252 is provided with a motive flow of bleed air via a supply 260. The bleed air supply will also typically be provided with an isolation valve 263 in the supply line 261. This provides a relatively low temperature and high pressure flow of air through inlet line 240, which splits into first and second inlet lines 242a and 242b for supplying the respective first and second inlets 231a, 231b of the oxygen separation units 230a and 230b.

Within the oxygen absorption units 230a, 230b oxygen from the air is adsorbed by the cobalt derived material. As such, air exiting from the first outlet 232a, 232b of the oxygen absorption unit into the outlet lines 222a, 222b has decreased oxygen content (and is therefore classed as NEA). The outlet lines 222 are connected to a conduit 220 in fluid communication with the fuel tank 212 so as to provide NEA to the ullage 214 above the fuel 215 of the fuel tank 212. A flow control valve 228 is provided in the conduit 220 to control the supply of NEA into the fuel tank (and can for example be used as a shut off valve).

Both the split inlet lines 242 and outlet lines 244 of each oxygen absorption unit 230 are provided with flow control valves 244 and 224. Thus, as explained below the system controller 280 may alternate the flow of air through either the first 230a or second 230b oxygen absorption unit.

To enable the oxygen absorption units 230a and 230b to be de-adsorbed of oxygen, a supply of bleed air 260 from the supply line may also be provided to an ejector 272a, 272b associated with the second outlet 234a, 234b of each oxygen absorption unit 230a, 230b. The bleed air supply is at a relatively high temperature and low pressure. In the illustrated example the same bleed air supply 260 feeds both the ejectors 272 associated with the outlets 234a, 234b of the oxygen absorption units and the ejector 252 of the inlet line 240. It will of course be appreciated that in other arrangements separate sources may be used.

Each of the supply lines 270a, 270b is provided with a control valves 271a, 271b (controlled by the controller 280) such that bleed air may normally be supplied to only a single ejector 272a, 272b. The bleed air supplied by lines 270a, 270b to the ejectors 272a, 272b provides the motive force. The inlet of the ejectors 272a, 272b is arranged in communication with the respective second outlet 234a, 234b of the chamber of the respective oxygen absorption unit 230a, 230b. The outlet of the ejector 274a, 274b is arranged to discharge Oxygen enriched air from the inerting system (typically this may simply be discharged overboard). Whilst this embodiment utilizes separate supply lines 270a, 270b and ejectors 272a, 272b, it will appreciate that in other embodiments a single line and single ejector could be selectively connectable to each absorption unit.

Operation of the embodiment of FIG. 5 will now be described. Bleed air from source 260 is provided through the flow control valve 254 to the ejector 252 where it is used as the ejector nozzle motive force. As a result, the inlet of the ejector 252 draws cabin air into the ejector 252 via the line 251. The ejector discharges the resulting relatively low temperature and high pressure air into the inlet line 240.

The controller alternately opens one of the control valves 244a, 244b in the split inlet lines 242a, 242b. The other of the control valves 244a, 244b is closed. Thus, the high pressure, low temperature inlet air normally enters only one of the oxygen separation units 230a, 230b. When the valve 244 of one of the oxygen absorption units is open the first outlet valve 224 is also open but the flow control valve 271 associated with the bleed air flow from to the ejector 272 of the same oxygen absorption unit will be closed.

Within the oxygen absorption unit which is receiving the inlet flow, the cobalt or cobalt derived material adsorbs oxygen from the air and the resulting NEA is expelled through the respective first outlet 232a/232b into the outlet lines 222a/222b and onward to the conduit 220 so as to be introduced to the tank. As the skilled person will appreciate, the provision of NEA into the tank causes normal air (containing a higher concentration of oxygen) to be forced out of the tank via the vent system.

An oxygen sensor 222 is provided in the outlet to monitor the oxygen concentration being provided to the fuel tank from the air separation module. When the oxygen content exceeds a predetermined threshold value the controller 280 is notified that the adsorption of oxygen of the oxygen absorption unit 230 is reduced (for example due to saturation of the cobalt or cobalt derived material). In response, the control will switch the active oxygen absorbing unit to the other parallel air separation module.

When the actively absorbing module 230*a*, 230*b* is switched the control system also switches the previously active unit to a desorption mode. Thus, when one unit is in the oxygen absorption mode (adsorbing oxygen due to the inlet pressure) the other unit is in the oxygen desorption mode (de-adsorbing oxygen) and visa versa. Accordingly a continually operating system may be provided.

For the oxygen absorption unit which is operating in the desorption mode the flow control valves 244 and 224 associated respectively with the inlet 231 and outlet 232 of the unit 230 are closed. The flow control valve in the bleed air supply to the ejector 272 associated with the second outlet 234 is open. The bleed air (at relatively high temperature and low pressure) enters the ejector 272 as the motive flow and acts to provide an adverse pressure gradient which draws oxygen from the cobalt or cobalt derived material within the chamber of the oxygen absorption unit. The removed oxygen and bleed air (which is oxygen enriched air) from the outlet of the ejector 272 exits the inerting system via an outlet line 274. The outlet line 274 may simply discharged the oxygen enriched air overboard. Advantageously, the nozzle effect on the bleed air within the ejector 272 will ensure that the temperature of any discharged oxygen enriched air is reduced and minimize or remove the risk of high temperature air being discharged overboard.

Although the invention as described above with reference to preferred embodiments, it will be appreciated that various changes or modifications may be made without departing from the scope of the invention, as defined in the appended claims. For example, whilst the embodiments described above generally utilize ejectors to provide motive force to the flow within the inerting system the skilled person will understand that other pump arrangements are possible (but that ejector type jet-pumps are particularly useful due to their reliable design and lack of moving parts). The skilled person will also readily appreciate that as the underlying principles of the embodiments of the invention are linked features from one embodiment may readily be utilized in another embodiment.

The invention claimed is:

1. An aircraft fuel tank inerting system, comprising:
an inlet, configured to be in fluid communication with a ullage of a fuel tank;
an oxygen absorption unit, in communication with said inlet to extract oxygen from the ullage, and comprising:
   a chamber,
   a temperature reversible oxygen absorption medium within said chamber, and
   a temperature controller for selectively heating in a desorption mode and cooling the medium in an adsorption mode;
a vent for discharging oxygen from the inerting system, wherein the reversible oxygen absorption medium is a medium which absorbs oxygen by chemisorption.

2. The aircraft fuel tank inerting system as claimed in claim 1, wherein the reversible oxygen absorption medium comprises Cobalt or a Cobalt derived material.

3. The aircraft fuel tank inerting system as claimed in claim 1, wherein the inerting system further comprises a control system the control system including control valves on the inlet and vent.

4. The aircraft fuel tank inerting system as claimed in claim 3, wherein the control system further controls the temperature controller.

5. The aircraft fuel tank inerting system as claimed in claim 1, wherein the temperature controller comprises a heater.

6. The aircraft fuel tank inerting system as claimed in claim 1, wherein the temperature controller comprises a heat exchanger associated with the chamber.

7. The aircraft fuel tank inerting system as claimed in claim 6, wherein the temperature controller is arranged to selectively supply the heat exchanger with hot or cold air.

8. The aircraft fuel tank inerting system as claimed in claim 1, wherein the system comprises a plurality of oxygen absorption units.

9. The aircraft fuel tank inerting system as claimed claim 8, wherein the plurality of oxygen absorption units are arranged in parallel and the system further comprises a valve arrangement to enable switching of the oxygen absorption unit that is in communication with the ullage.

10. The aircraft fuel tank inerting system as claimed in claim 1, wherein the inerting system is arranged to cycle the, or each, oxygen absorption unit between:
a first, oxygen absorbing, configuration, in which:
   the oxygen absorption unit is in fluid communication with the fuel tank ullage,
   the temperature controller is cooling the medium; and
a second, oxygen desorption, configuration, in which:
   the oxygen absorption unit is isolated from the fuel tank ullage; and
   the temperature controller is heating the medium.

11. The aircraft fuel tank inerting system as claimed in claim 10, wherein the inerting system comprises a plurality of oxygen absorption units and the oxygen absorption units are configured or controlled such that at least one unit is in the first, oxygen absorption, configuration when another unit is in the second, oxygen desorption, configuration, such that continuous oxygen absorption is available.

12. The aircraft fuel tank inerting system as claimed in claim 1, wherein the vent for discharging oxygen from the inerting system comprises an ejector.

13. The aircraft fuel tank inerting system as claimed in claim 12, wherein the vent is provided with motive flow from a source of pressurised air.

14. An aircraft comprising at least one fuel tank and an inerting system as claimed in claim 1.

15. The aircraft fuel tank inerting system as claimed in claim 7, wherein the heat exchanger is a jacket partially surrounding a portion of the chamber, the jacket being arranged to circulate the hot air or cold air.

16. The aircraft fuel tank inerting system as claimed in claim 15, wherein at least one of:
the hot air is provided from bleed air; and
the cold air is provided from cabin waste air or a ram air source.

17. The aircraft fuel tank inerting system as claimed in claim 3, wherein:
in the absorption mode, at least one control valve on the inlet is open and a control valve on the vent is closed to draw the oxygen from the ullage into the chamber of the oxygen adsorption unit; and in the desorption mode, the at least one control valve on the inlet is closed and the control valve on the vent is open.

\* \* \* \* \*